United States Patent [19]
Kriegesmann et al.

[11] Patent Number: 4,889,548
[45] Date of Patent: Dec. 26, 1989

[54] USE OF AN OXIDE CERAMIC MATERIAL FOR COMPRESSION MOLDS FOR SHAPING ELEMENTS MADE FROM GLASS OR A GLASS-CONTAINING CERAMIC AND HAVING HIGH SURFACE QUALITY AND DIMENSIONAL ACCURACY

[75] Inventors: Jochen Kriegesmann, Hoehr-Grenzhausen; Henning Franek, Braunfels-Tiefenboch; Waldemar Bluethgen, Braunfels, all of Fed. Rep. of Germany

[73] Assignee: Ernst Leitz Wetzlar GmbH, Wetzlar, Fed. Rep. of Germany

[21] Appl. No.: 155,725

[22] PCT Filed: Mar. 17, 1987

[86] PCT No.: PCT/DE87/00112
§ 371 Date: Jan. 6, 1988
§ 102(e) Date: Jan. 6, 1988

[87] PCT Pub. No.: WO87/05594
PCT Pub. Date: Sep. 24, 1987

[30] Foreign Application Priority Data
Mar. 17, 1986 [DE] Fed. Rep. of Germany ....... 3608854

[51] Int. Cl.$^4$ .............................................. C03B 11/08
[52] U.S. Cl. ..................... 65/305; 65/374.1; 65/374.13; 106/38.9
[58] Field of Search ................ 65/305, 374.1, 374.13; 106/38.9

[56] References Cited

U.S. PATENT DOCUMENTS

| | | | |
|---|---|---|---|
| 3,728,098 | 4/1973 | Giffen | 65/361 |
| 4,168,961 | 9/1979 | Blair | 65/66 |

FOREIGN PATENT DOCUMENTS

| | | |
|---|---|---|
| 3408096 | 10/1984 | Fed. Rep. of Germany . |
| 2322835 | 4/1977 | France . |
| 844721 | 2/1985 | South Africa . |

OTHER PUBLICATIONS

Berichte Der Deutschen Keramischen Gesellschaft, vol. 44, Nr. 11, 1978; pp. 487–491.
"Nature", vol. 258, Dec. 25, 1975; pp. 703 and 704.
"Journal of the American Ceramic Society"; vol. 68, No. 1, Jan. 1985; C4–C5.

*Primary Examiner*—Arthur Kellogg
*Attorney, Agent, or Firm*—Foley & Lardner Schwartz, Jeffery, Schwaab, Mack, Blumenthal & Evans

[57] ABSTRACT

The use is described of oxide ceramic materials for compression molds for shaping elements made from glass or a glass-containing ceramic and having high surface quality and tight tolerances. The materials are polycrystalline, monophasal or polyphasal materials which are contact-inert towards the optical elements to be pressed and which, in addition, have significantly better mechanical and thermal properties than monocrystalline substances, which, in principle, exhibit an anisotropic behavior as a consequence of their geometrical anisotropy. The material intended for use according to the invention can comprise a $Al_2O_3$ ceramic or a $ZrO_2$— and/or $HfO_2$-containing ceramic. The material can also be built up in several phases, i.e. can contain a matrix component and at least one particle component dispersed discretely in it. They are preferably $ZrO_2$-containing ZTC, PSZ or TZP ceramics, which, for the application according to the invention, have excellent thermomechanical properties which are founded in the reaction mechanism and, above all, in the crystallography of their components. Mechanisms such as so-called "stress-induced conversion toughening" and "microcrack toughening" play an important part here.

With the materials used, compression molds can be produced for reworking-free shaping of optical elements having planar and/or spherical and/or aspherical convex and/or concave surfaces of high surface quality and dimensional accuracy, while noting improved production processes.

19 Claims, No Drawings

USE OF AN OXIDE CERAMIC MATERIAL FOR COMPRESSION MOLDS FOR SHAPING ELEMENTS MADE FROM GLASS OR A GLASS-CONTAINING CERAMIC AND HAVING HIGH SURFACE QUALITY AND DIMENSIONAL ACCURACY

The invention relates to the use of inorganic, nonmetallic, oxide ceramic materials as compression molds for the production of elements made from glass and/or a glass-containing ceramic and having high quality and dimensional accuracy. As a consequence of their shape accuracy and surface quality, the optical elements thus produced need not be subjected to further, expensive processing, such as grinding, polishing etc.

PCT/DE 84/00,128 has already disclosed compression molds for optical elements which comprise monocrystalline, nonmetallic, inorganic materials, such as, for example, NiO, $Cr_2O_3$, sapphire or spinell. Although these materials are suitable, in particular, for use at high temperatures with respect to their contact inertness, considerable difficulties arise during the production of the compression molds and during the pressing processes themselves carried out therewith as a consequence of the anisotropic character of the materials and as a consequence of their strength behavior.

Monocrystalline substances, ie. so-called "monocrystals", exhibit anisotropy in their physical, chemical, mechanical and thermal properties; ie. the properties mentioned here change as a function of the crystallographic orientation present in each case.

Thus, for example, the hardness, and thus the abrasion resistance, of monocrystals varies depending on the orientation. This state of affairs alone leads to various erosion rates during polishing, so that the precision of shaping, which is in the nanometer region in the case of such molds, can only be achieved with difficulty.

Since the mold must be heated to high temperatures during the actual pressing process, a material expansion caused by the heat takes place. In the case of monocrystalline materials, this is again dependent on the crystallographic orientation of the pertinent monocrystal. This means that the geometry of the compression mold which is present at room temperature changes in a fashion such that the optical elements to be shaped do not have the desired or necessary optical precision fit. This has the consequence that complicated mathematical computational operations for retrocorrection of the mold become necessary. A further disadvantage of monocrystalline materials is that the production of a spatial shape, for example a dish shape, can only be carried out if the crystal has previously been aligned precisely with respect to its crystal axes using complicated light or x-ray optical methods and clamped.

In addition to the heat-expansion anisotropy to be found in noncubic monocrystals, anisotropy of the elastic constants, which, like the hardness anisotropy discussed above and the thermal conductivity anisotropy discussed below, also applies to maximum-symmetry cubic monocrystals, presents difficulties, since the pressing process, logically, proceeds under pressure and crystal orientation-dependent elastic expansion or contraction must also be taken into account.

Anisotropy of the therml conductivity has a negative effect in that local overheating occurs both in the compression mold and in the pressed part itself, thus causing thermally induced mechanical stresses and buckling.

With respect to the strength behavior, monocrystals prove to be extremely brittle. The so-called critical stress intensity factor $K_{ic}$ can be regarded as a measure of the brittleness, where $$K_{ic} = \sigma \cdot \sqrt{a} \cdot f [MN/m^{3/2}]$$

in this formula, $\sigma$: denotes the externally applied tensile stress on;

a: denotes the length of a crack perpendicular to the external tensile stress, and f: denotes a geometry factor.

For example, this value for monocrystalline aluminum oxide is merely:

$$K_{ic}(Al_2O_3) = 2 \, MNm^{-3/2}.$$

For the use of monocrystal molds, this principally means an increased danger of fracture under mechanical and thermal load.

The object of the present invention is, therefore, to specify materials for compression molds for optical elements which materials do not have the disadvantages of the materials which are known for the applications mentioned and which permit substantially longer use as compression molds while retaining their respective geometrical spatial shapes under extreme physicochemical, thermal and mechanical process conditions.

This object is achieved according to the invention in that the oxide ceramic material proposed is present in polycrystalline form. This can expediently comprise aluminum oxide ($Al_2O_3$) ceramic. It is also possible that it comprises a monophase zirconium dioxide ($ZrO_2$) and/or hafnium dioxide ($HfO_2$) ceramic. In addition, however, the material can also be a multiphase $ZrO_2$— and/or $HfO_2$—containing ceramic which is composed of a matrix component and at least one particle component which is dispersed discretely in it. In a further embodiment of the present invention, the matrix component of the material can be a ceramic made from cubis and/or tetragonal $ZrO_2$ or $HfO_2$ or a $(Zr,Hf)O_2$ mixed crystal phase. It is also possible for the ceramic to comprise at least two matrix components, for example tetragonal $ZrO_2$ and $Al_2O_3$ and/or chromium oxide ($Cr_2O_3$). According to a preferred embodiment of the present invention, an oxide ceramic material is used which comprises a polycrystalline matrix in which $ZrO_2$ and/or $HfO_2$ and/or $(Zr,Hf)O_2$ crystallites are distributed homogeneously as discrete particles. In this case, these particles are present in polymorphous modification, arising in each case in their low-symmetry crystal lattice structure, at least in the surface region of the material. Thus, a specific embodiment comprises the particles in the surface region of the material having a monoclinic crystal lattice structure and those in the interior of the material having a tetragonal crystal lattice structure. It is expedient that the particles have a size between 5 and 5,000 nanometers (nm)—preferably between 100 and 1,000 nm.

It is also possible for the polycrystalline matrix component to comprise at least one of the following substances: cubic $ZrO_2$, $Al_2O_3$, $Cr_2O_3$, an Al/Cr mixed oxide (($Al,Cr)_2O_3$) or a spinell (for example $MgO \cdot Al_2O_3$). The material intended for use according to the invention can furthermore comprise cubic $ArO_2$ as the matrix component in which tetragonal $ZrO_2$ and/or $HfO_2$ and/or $(Zr,Hf)O_2$ crystalline are distributed as discrete particles. In this case, it is advantageous for the tetragonal particles to be present in the matrix in coherent, crystallized form. According to a further embodiment of the present invention, the ceramic may additionally contain at least one of the partially-stabilized oxides listed below (in each case in mol %): yttrium oxide ($Y_2O_3$): 3.5 to 12; cerium oxide ($CeO_2$): 3.5 to 12; magnesium oxide (MgO): 6 to 16; calcium oxide (CaO): 6 to 16, and oxides of the rare earths (RE oxides): 3.5 to 12. According to a subvariant, the ceramic here advantageously has a $CeO_2$:$ZrO_2$ molar ratio between 8:92 and 30:70. In addition, it is possible for the material to comprise exclusively at least one of the substances intended for the matrix component. It is also possible, in addition, for up to 2% by weight of dopes from the group comprising the oxides: MgO, nickel oxide (NiO), tungsten oxide ($WO_3$) and/or molybdenum oxide ($MoO_3$) to be present. The density of the material intended for use according to the invention is at least 95%—preferably 100%—of the theoretical density.

The advantages of the polycrystalline, mono- or polyphase oxide ceramic material specified as a material for compression molds for postworking-free shaping of elements made from glass or a glass--containing ceramic and having planar and/or spherical and/or aspherical convex and/or concave surfaces and having high surface quality and dimensional accuracy are, firstly, that they have no macroscopic anisotropy, in contrast to monocrystal materials, and, secondly, they have a markedly lower brittleness than corresponding monocrystals. Thus, polycrystalline, dense $Al_2O_3$ has a stress intensity factor $K_{ic}$ of 4–5 [MN $\cdot m^{-1.5}$]; it is thus more than twice as great as that of a corresponding moncrystal. The polycrystalline material element thus represents an important improvement for solution of the technical task mentioned.

In addition, special ceramics have been described and developed in recent years which feature a particularly outstanding strength behaviour. For example, $K_{ic}$ values of 17 $Mnm^{-1.5}$ have already been measured. These are $ZrO_2$— and/or $HfO_2$ strengthened dispersion ceramics ("ZTC" ceramics: "Zirconia-Toughened Ceramics"). They also have, inter alia, an excellent thermal shock resistance, cf. Berichte der Deutschen Keramischen Gesellschaft [Reports of the German Ceramics Society], Volume 55, No. 11, 1978, 487-491.

Materials of the type mentioned may be monophasal, such as, for example, the "TZP" ("Tetragonal Zirconia Polycrystal") ceramics, cf. German Offenlegungschrift 3,408,096, or alternatively comprise several phases, such as the "PSZ" (Partially Stabilized Zirconia") ceramics, cf. Nature, Vol. 258, Dec. 25, 1975, 703-704. In addition, a conversion-toughened aluminum oxide or corresponding ceramics, as are known, for example, from American Ceramic Society, Vol. 68, No. 1, January 1985, C4-C5.

The active oxide here is $ZrO_2$ or $HfO_2$ or an isomorphous mixed crystal form of both the starting components mentioned, which—if appropriate together with oxides such as CaO, MgO, $Y_2O_3$, $CeO_2$ and RE oxides—are incorporated into the ceramic. The $ZrO_2$— and/or $HfO_2$— toughened dispersion ceramics generally comprise a matrix in which $ZrO_2$ and/or $HfO_2$ are finely distributed—ie. dispersed. The matrix can be $Al_2O_3$, a cubic $ZrO_2$ phase, $Cr_2O_3$ or, for example, a representative of the spinell group (cubic double oxide).

The dispersed, particulate $ZrO_2$ and/or $HfO_2$ phase exists in the tetragonal modification at the production temperature of ceramic. Below 1,150° C., the tetragonal phase tends to be converted into the low-symmetry, bulkier monoclinic phase. If the particles dispersed in the matrix are very finely divided, the phase conversion can be "shifted" or "delayed" to below room temperature, since the matrix pressure "hinders" the new crystal lattice-structural orientation of the particle components, which is connected with a volume increase.

If an extremely large pressure is exerted externally on the polycrystalline material, so that a microcrack forms in the matrix, this will generally only be able to continue to a $ZrO_2$ or $HfO_2$ particle, where, as a consequence of the locally weakened matrix pressure, the conversion, hitherto prevented, into a low-symmetry, larger-volume modification takes place. This lattice restructuring process consumes energy, so that the consequence is an immediate slowing, or even termination, of the microcrack propagation speed. In addition, the more bulky particles virtually "block" the corresponding microcracks. In this fashion, the stress intensity factors and the strength values can be appreciably increased.

It was possible to achieve a further improvement in this respect by constantly reducing the matrix phase. Through addition of $CeO_2$ and $Y_2O_3$, it has even been possible to develop a ceramic which comprises exclusively a dispersed $ZrO_2$ phase. To a certain extent, a "matrix" pressure is achieved without an actual "matrix" in the conventional sense being present. This ceramic is a so-called "TZP" (Tetragonal Zirconia Polycrystal") ceramic.

In addition to all the mechanical properties described above, all the ceramics intended for use according to the invention have a positive surface strengthening. This is caused by the fact that there is no matrix pressure acting on all sides in the regions near the surface. In the proximity of the surface, the tetragonal particles are converted into the more bulky monoclinic modification, as early as during production of the ceramic above room temperature, so that compressive stresses occur at the surface, leading to a further improvement in the material properties in the sense of a surface "toughening". Compressive stresses at the material surface can, in principle, be achieved by grinding and polishing processes as as a consequence of local heating. This toughening mechanism is commonly called "stress-induced conversion toughening".

However, the stress intensity factor $K_{ic}$ can be appreciably increased even if the particles are coarser, so that they are converted during their formation even before room temperature is reached. A network of very small microcracks is produced through the conversion of the now coarser particles. If energy is transferred elastically to the ceramic by an externally acting stress, the energy is distributed amongst a large number of microcracks and not—as in normal polycrystalline or monocrystalline, nonmetallic, inorganic, bodies—to a single microcrack. The toughening mechanism just described is called "microcrack toughening".

In addition to the material-specific advantages described here, use of the materials mentioned in the sense according to the invention causes drastically increased economic efficiency, which is, on the one hand, a result of the relatively high creep resistance and, on the other hand, a result of significantly cheaper production of the materials compared to the monocrystalline materials known hitherto. Finally, there are also dimensioning problems for the compression molds, which, naturally, were dependent on the monocrystal volumes available in each case.

The compression molds can have a very wide variety of geometrical planar, convex and/or concave shapes. They may be in one or several parts. Of particular advantage for the application intended is the material property, discussed above, that, during shaping or cutting of the molds—ie. during creating of fresh surface (part) regions—precisely these zones are additionally surface-toughened as a consequence of the reaction mechanism, the matrix/particle conformation and, above all, the crystallographic matrix/particle constitutions.

By means of known techniques using elevated temperature and/or with the aid of pressure, the polycrystalline ceramic material can be combined to form ceramic bodies having a density corresponding to the theoretical density of the particular material.

We claim:

1. The use of an oxide ceramic material for compression molds for shaping elements made from glass or a glass-containing ceramic and having high quality and dimensional accuracy, wherein the material is present in polycrystalline form and the matrix component thereof comprises a ceramic made from one of a cubic and/or tetragonal $HfO_2$ or $(Zr,Hf)O_2$ mixed crystal phase.

2. The use as claimed in claim 1, wherein the material comprises a monophasal $ZrO_2$— and/or $HfO_2$— containing ceramic.

3. The use as claimed in claim 1, wherein the material comprises a multiphasal $ZrO_2$— and/or $HfO_2$— containing ceramic which is composed of a matrix component and at least one particle component dispersed discretely in the ceramic.

4. The use as claimed in claim 1 wherein the matrix component is a ceramic made from cubic and/or tetragonal $ZrO_2$.

5. The use as claimed in claim 1 wherein the ceramic comprises at least two matrix components.

6. The use as claimed in claim 5, wherein the matrix components comprise tetragaonal $ZrO_2$ and $Al_2O_3$ and/or $Cr_2O_3$.

7. The use as claimed in claim 1, wherein the material comprises a polycrystalline matrix in which $ZrO_2$ and/or $HfO_2$ and/or $(Zr,Hf)O_2$ crystallites are distributed homogeneously as discrete particles.

8. The use as claimed in claim 7, wherein the particles have polymorphous modifications and are present in each case in their low-symmetry crystal lattice structure in the surface region of the material.

9. The use as claimed in claim 8, wherein the particles in the surface region of the material have a monoclinic crystal lattice structure and those in the interior of the material have a tetragonal crystal lattice structure.

10. The use as claimed in claim 7 wherein the particles have a size between 5 and 5,000 nm—preferably between 100 and 1,000 nm.

11. The use as claimed in claim 1, wherein in the polycrystalline matrix component comprises at least one of the following additional substances: $Al_2O_3$, $Cr_2O_3$, $(Al,Cr)_2O_3$ and a spinell.

12. The use as claimed in claim 1, wherein the matrix component comprises cubic $ZrO_2$ in which tetragonal $ZrO_2$ and/or $HfO_2$ and/or $(Zr,Hf)O_2$ crystallites are distributed as discrete particles.

13. The use as claimed in at least one of the previous claims, wherein the tetragonal $ZrO_2$ and/or $HfO_2$ and/or $(Zr,Hf)O_2$ particles are present in the matrix in coherently crystallized form.

14. The use as claimed in claim 1, wherein the ceramic additionally contains at least one of the partially stabilized oxides listed below (in mol %):

| | |
|---|---|
| $Y_2O_3$: | 3.5 to 12, preferably 8 to 10 |
| $CeO_2$: | 3.5 to 12, preferably 8 to 10 |
| MgO: | 6.0 to 16, preferably 8 to 14 |
| CaO: | 6.0 to 16, preferably 8 to 14 |
| RE oxides: | 3.5 to 12, preferably 8 to 10. |

15. The use as claimed in claim 1 wherein the ceramic has a $CeO_2:ZrO_2$ molar ratio between 8:92 and 30:70.

16. The use as claimed in claim 1, wherein the material comprises exclusively at least one of the substances intended for the matrix component.

17. The use as claimed in claim 1, wherein up to 2% by weight of dopes from the group comprising the oxides MgO, NiO, $WO_3$ and/or $MoO_3$ are additionally present.

18. The use as claimed in claim 1 wherein the material has a density of at least 95%—preferably 100%—of the theoretical density.

19. The use as claimed in claim 1 wherein the polycrystalline, monophasal or polyphasal oxide ceramic material is intended as a material for a compression mold for reworking-free shaping of elements made from glass or a glass-containing ceramic, having planar and/or spherical and/or aspherical convex and/or concave surfaces and having a high surface quality and dimensional accuracy.

* * * * *